No. 817,269. PATENTED APR. 10, 1906.
O. M. OTTE.
FIREPROOF WINDOW.
APPLICATION FILED SEPT. 3, 1904.
6 SHEETS—SHEET 3.
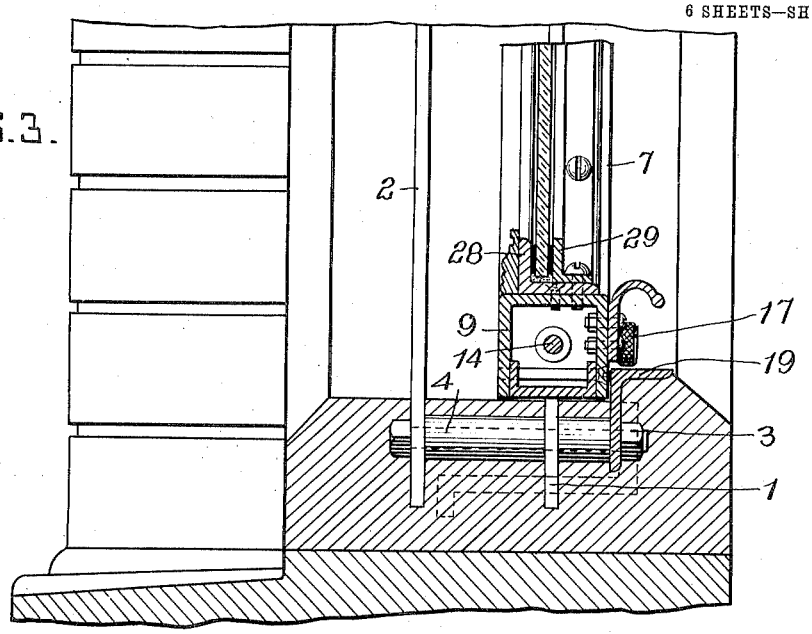
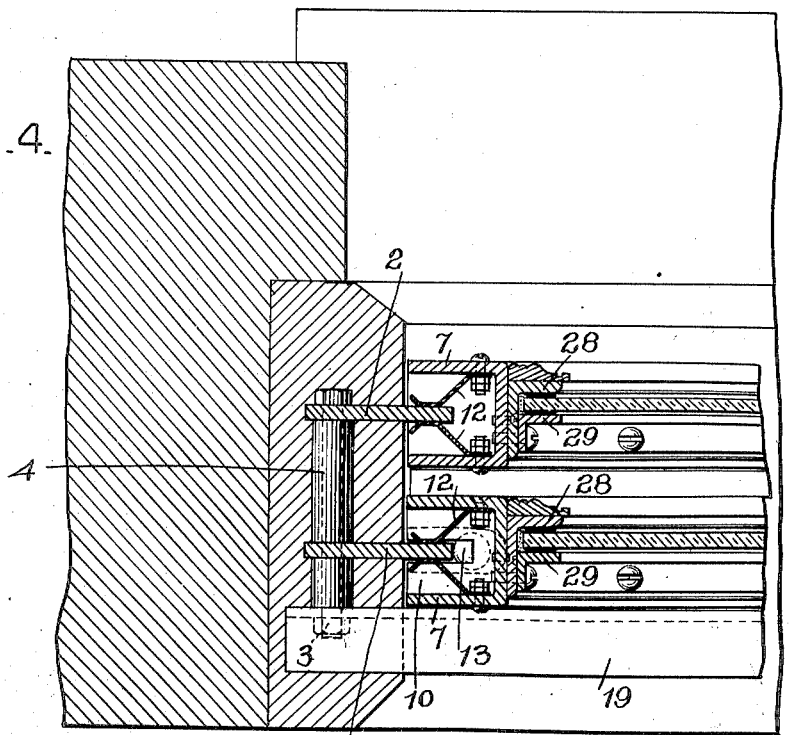
WITNESSES: Herbert Bradley. F. E. Gaither.
INVENTOR
Otho M. Otte
by Christy and Christy
Attys.

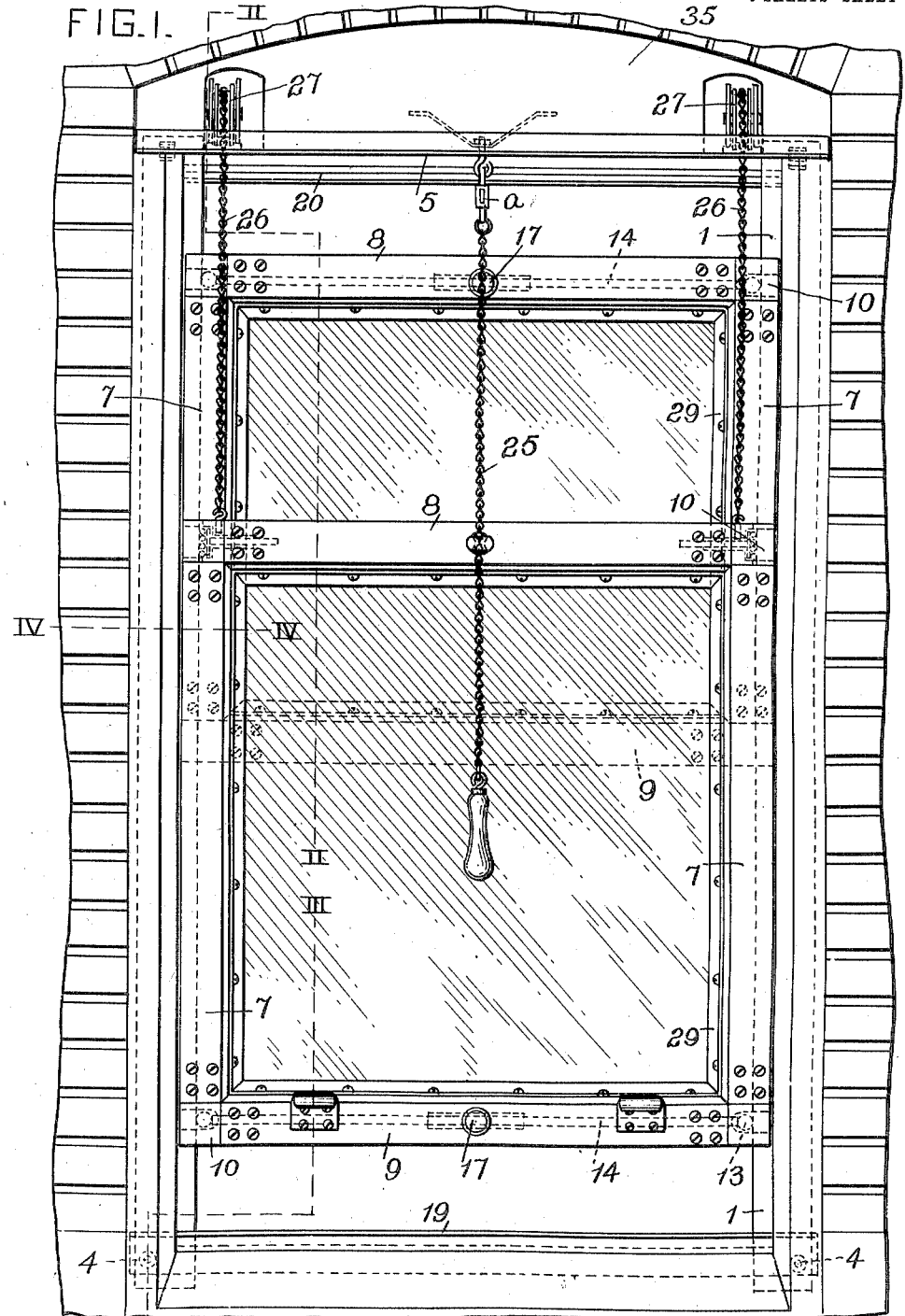

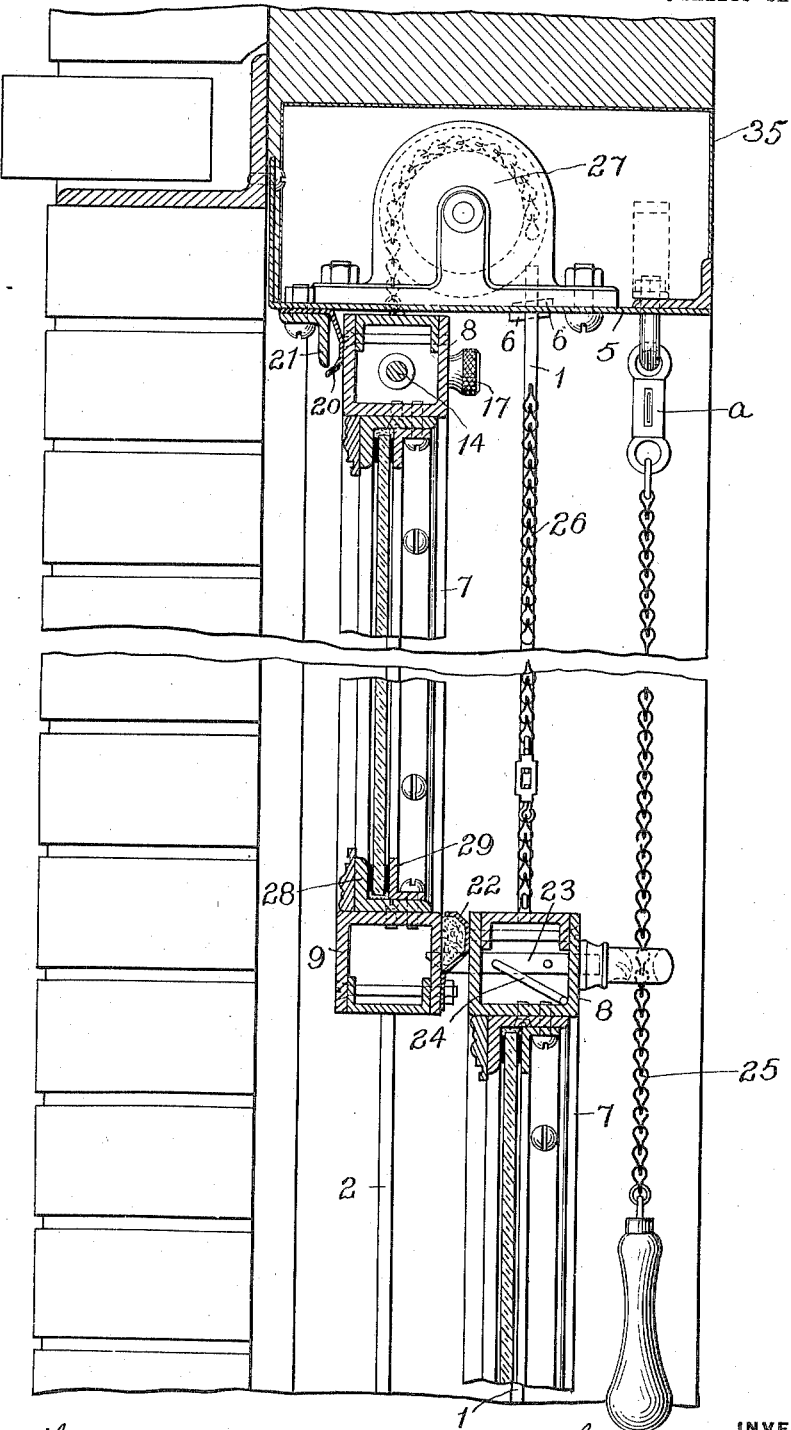

No. 817,269. PATENTED APR. 10, 1906.
O. M. OTTE.
FIREPROOF WINDOW.
APPLICATION FILED SEPT. 3, 1904.
6 SHEETS—SHEET 4.
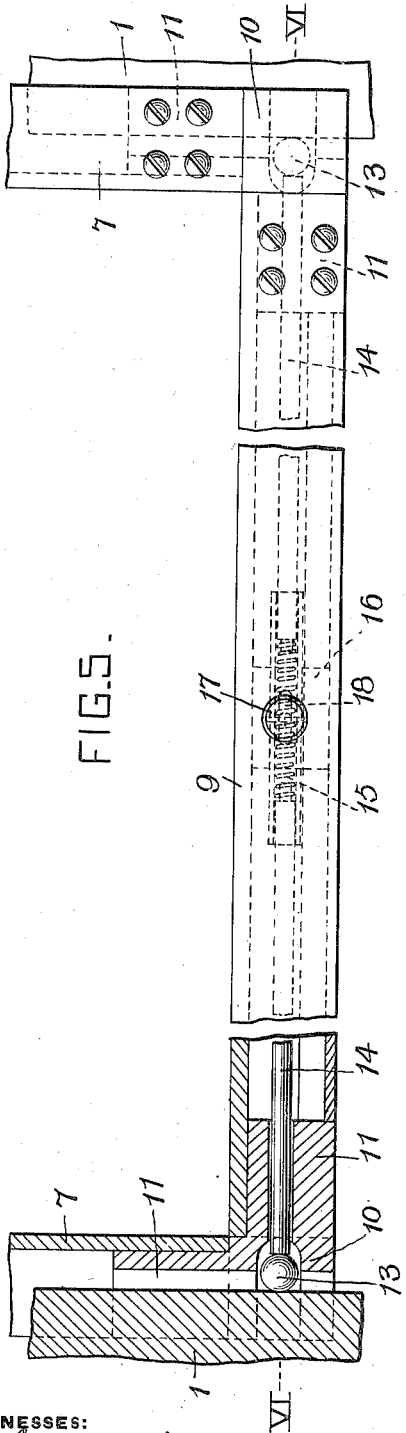
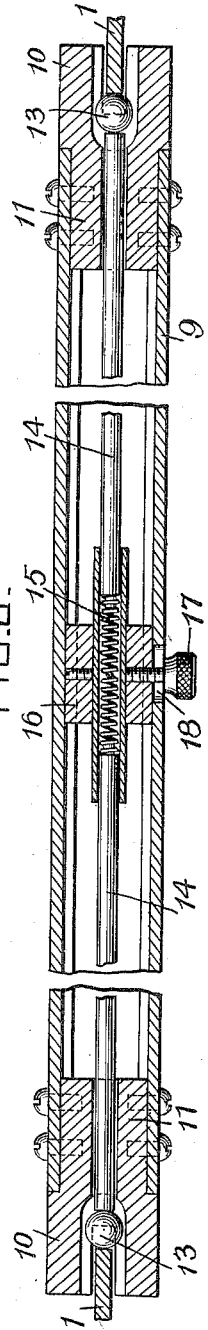
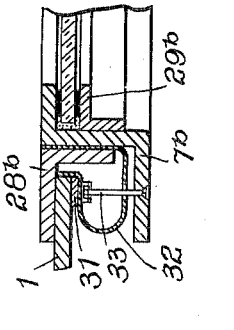
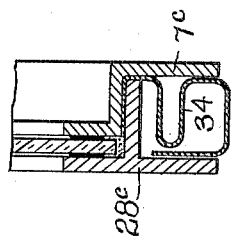
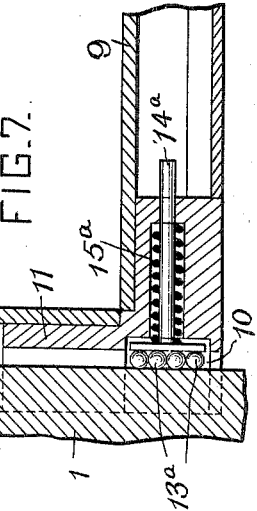
WITNESSES: Herbert Bradley, F. E. Gaither
INVENTOR Otho M. Otte
by Christy and Christy
Att'ys No. 817,269. PATENTED APR. 10, 1906.
O. M. OTTE.
FIREPROOF WINDOW.
APPLICATION FILED SEPT. 3, 1904.
6 SHEETS—SHEET 5.
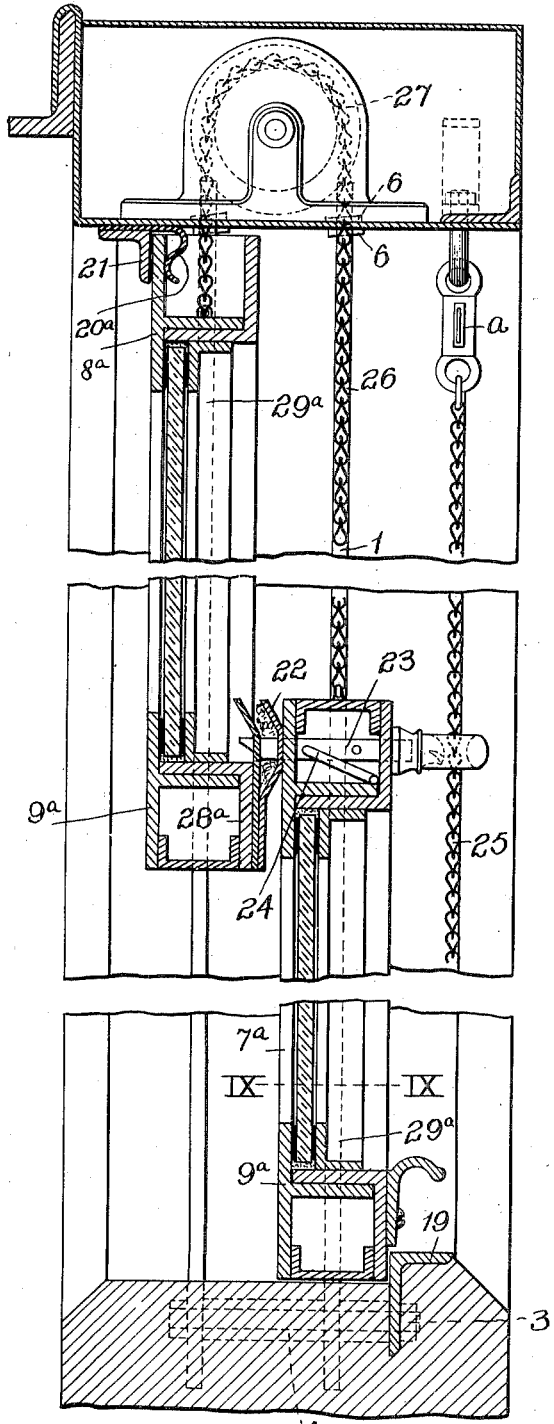
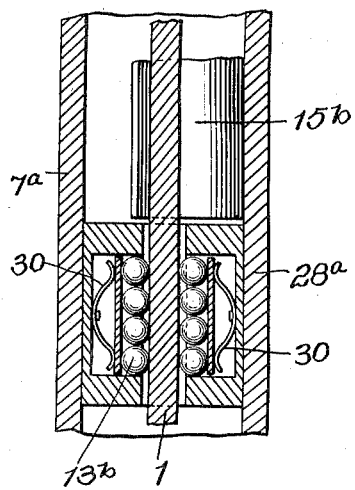
WITNESSES: Herbert Bradley. F. E. Gaither.
INVENTOR
Otho M. Otte
by Christy and Christy
Attys.

No. 817,269. PATENTED APR. 10, 1906.
O. M. OTTE.
FIREPROOF WINDOW.
APPLICATION FILED SEPT. 3, 1904.
6 SHEETS—SHEET 6.
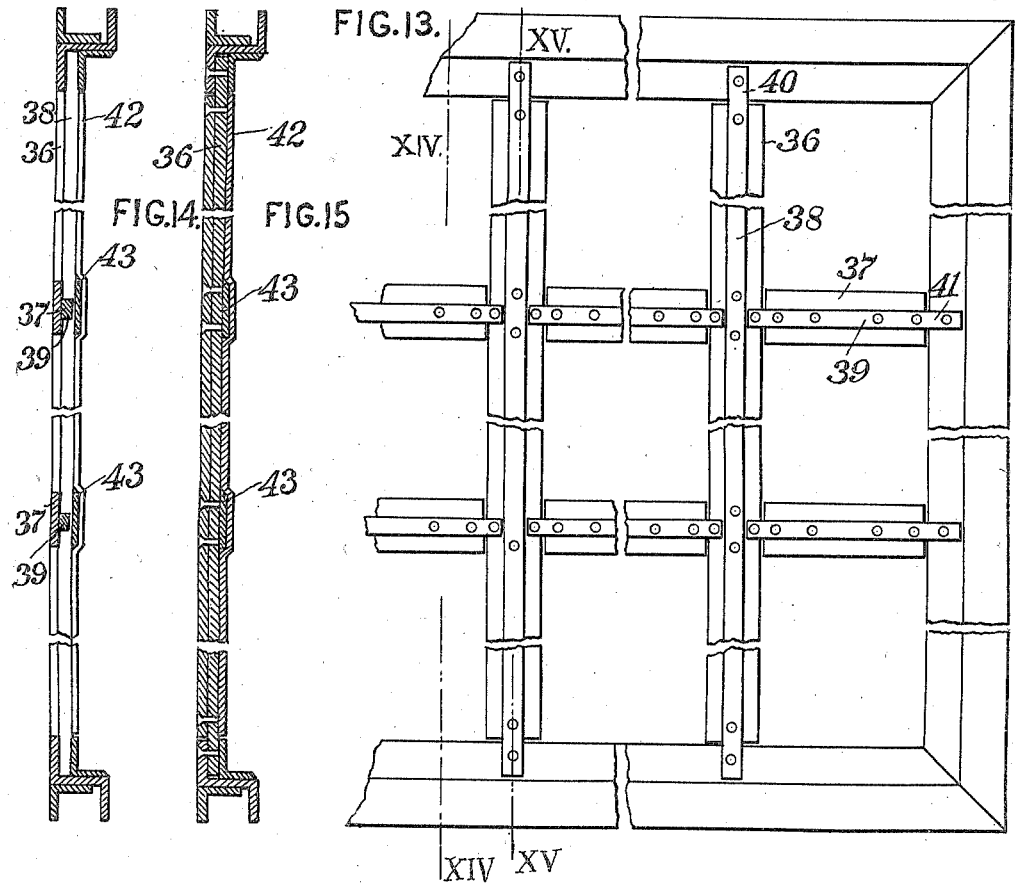
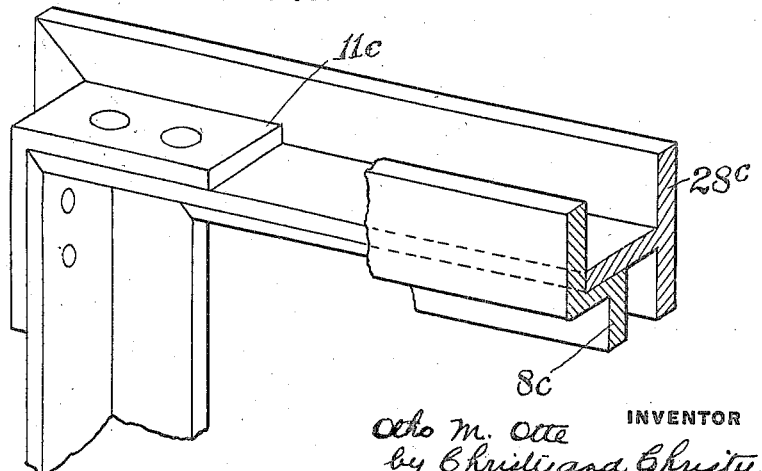

UNITED STATES PATENT OFFICE.

OTHO MENDLESOHN OTTE, OF PITTSBURG, PENNSYLVANIA.

FIREPROOF WINDOW.

No. 817,269.           Specification of Letters Patent.           Patented April 10, 1906.

Application filed September 3, 1904. Serial No. 223,229.

*To all whom it may concern:*

Be it known that I, OTHO MENDLESOHN OTTE, a citizen of the United States, residing at Pittsburg, in the county of Allegheny and State of Pennsylvania, have invented or discovered certain new and useful Improvements in Fireproof Windows for Buildings, of which improvements the following is a specification.

The invention described herein relates to certain improvements in fireproof windows for buildings, and has for its object a construction and combination of parts whereby the sashes move in the openings formed in the wall without the interposition of a guiding and supporting frame.

It is a further object of the invention to provide dust and fire proof seals along the edges of the sashes and to so dispose such seals that they shall be protected from distortion and injury either by hard use or by heat; further, to provide for the automatic closing of the sashes when the temperature adjacent thereto reaches a dangerous height; finally, in structural features, all of which are hereinafter more fully described and claimed.

In the accompanying drawings, forming a part of this specification, Figure 1 shows in elevation a portion of a wall of a building provided with a window which embodies my improvements. Fig. 2 is a section on the line II II, Fig. 1. Fig. 3 is a similar view of the lower portion of the window, the line of section being indicated at III III. Fig. 4 is a horizontal section on the line IV IV, Fig. 1. Fig. 5 is a view, partly in elevation and partly in section, showing in detail the construction of the lower end of the lower sash of Fig. 1. Fig. 6 is a section in the line VI VI, Fig. 5. Fig. 7 is a view similar to a portion of Fig. 5, showing a structural modification. Fig. 8 is a view similar to Figs. 2 and 3, illustrating structural modifications. Fig. 9 is a horizontal section through the side of the lower sash of Fig. 8, the line of section being indicated at IX IX. Fig. 10 is a section on the line X X, Fig. 9. Figs. 11 and 12 are sectional views of detailed parts. Fig. 13 is a view in elevation of a window-sash from within, showing the arrangement of exterior braces for the window-panes, the interior braces and the panes being removed. Figs. 14 and 15 are sectional views on the lines XIV XIV and XV XV, Fig. 13; and Fig. 16 is a detailed perspective view illustrating a modification in corner construction.

In the several figures structural parts which are repeated bear the same reference-numerals in each case.

In the practice of my invention guide-strips 1 and 2 are embedded firmly in the side walls of the window-opening. It is preferred that these guide-strips should be properly spaced and tied together at their lower ends by means of bolts 3 and sleeves 4, the latter surrounding the bolts between the strips. They may be spaced and tied at other suitable or desired points throughout their length. It is preferred that the bolts and sleeves should be embedded in the sill or side walls of the window-opening, as shown. The upper ends of the strips project through a top plate 5, resting at its ends on the side walls of the window-opening. The guides and top plate are adjustably connected by wedges 6, passing through slots in the strips and bearing on opposite sides of the plate.

The side rails 7, top rail 8, and bottom rail 9 of the sashes are formed of channel-bars, connected at their corners by malleable cast-iron blocks 10, provided with reduced angular extensions 11, fitting into the channel-bars and secured thereto by screws or rivets.

A modification in structure is shown in Fig. 16. The side and top rails (formed in this instance of Z-bars 8° and of T-bars 28°) are mitered at the corner and secured by a strap 11°, which lies in the channel formed by the bars and to which the bars are riveted.

As shown in Fig. 4, the guide-strips project into the channels forming the side rails 7, and the sash is held yieldingly from lateral movement and also guided by spring-plates 12, secured in the channels and bearing against the sides of the guides. These springs, which will be protected from the heat and flames by the sides of the channels, serve as sealing-strips to prevent the passage of dust, smoke, &c.

In order to prevent edgewise movement of the sash, balls 13 are mounted in the corner-blocks 10 and are yieldingly pressed against the edges of the guide-strips.

A convenient construction for yieldingly holding the sash against edgewise movement is shown in Fig. 5 and consists of rods 14, extending transversely through the channel-bar, which forms the bottom rail 9 of the sash, backed by springs and abutting against the said balls. In the form shown in Figs. 5 and 6 two rods extend from either side approximately to the middle, where they bear upon opposite ends of a coiled spring 15. This spring is carried in a block 16, adjustable longitudinally in rail 9 and secured in place by a clamping-screw 17, which engages the block and the edges of a slot 18 in rail 9. Thus the relative pressures of the spring-backed bearings on opposite sides of the sash may be adjusted. This is a matter of convenience in adjusting the window to its opening and in changing the adjustment in case the wall of the building settles or is otherwise slightly distorted. A modification of this ball-bearing structure is shown in Fig. 7. The view corresponds with the left-hand end of Fig. 5. In place of a single ball a plurality of balls $13^a$ are employed. In place of rod 14 a rod $14^a$ is employed, provided at its outer end with a suitable bearing-surface for the balls. Rod $14^a$ is yieldingly mounted in the sash by means of a spring $15^a$, which surrounds the rod and bears at one end against the rear wall of a suitably-formed containing-cavity and at the other end upon a suitably-disposed shoulder upon the rod itself.

In Fig. 1 I have shown in a single structure both forms of bearing described above.

In Fig. 11 I have illustrated another means of holding the sash against edgewise movement between the guide-strips. A spring-plate 32, carried by the sash, engages strip 1, and the parts are so disposed that the tension of the spring is exerted to resist any lateral movement of the sash. It will be noted of the form shown in Fig. 11 that the spring-plate 32 serves not only to hold the sash against movement, but serves also as a sealing-strip for the purpose already described in connection with spring-plates 12 of Fig. 4.

The ledge 19 on the sill is formed by an angle which is preferably embedded in the sill and tied to the guide-strips by the bolts 3, as shown.

In order to prevent the entrance of dust above the upper sash, a spring 20 is attached to an angle-bar 21, secured to the top plate 5 in such manner that the free portion of the spring will bear against the upper sash-rail when the sash is closed. A modification of this feature is illustrated in Fig. 8, where the spring $20^a$ instead of engaging the exterior of the top rail of the sash is adapted when the sash is raised to enter the channel which in that form extends across the upper edge of the sash and to engage the inner surface of the channel-wall. A hermetic joint is formed at the meeting-rails of the sashes by means of a spring-plate 22, secured to the rail of the upper sash and adapted to bear against the rail of the lower sash. In order to prevent this spring-plate from being distorted or destroyed by heat, a back of fluff asbestos is provided.

A convenient lock consists of a pin 23, arranged to move transversely of the channel forming the upper rail of the lower sash and caused to engage the upper sash by a spring 24, arranged in the channel-bar of the lower sash. The handle of this pin is constructed to permit of the sash-supporting chain 25 being detachably connected thereto. This chain is connected at one end to top plate 5, the free or depending part being adapted, as stated, to be connected at any point to the pin 23. The upper rails of the sashes are connected by chains 26 passing over pulleys 27 on the top plate, so that a movement of one sash will cause or permit a corresponding movement of the other sash. The lower sash is made heavier than the upper sash by the placing of suitable weights in the lower rail of the lower sash, so that when free to move the lower sash will drop, raising the upper sash. In order that the sashes will close automatically in case of fire, a portion $a$ of the chain is formed of readily-fusible material and preferably located near the top of the upper sash, as shown. By forming within the arch of the window-opening a concrete box or block 35, as illustrated in Figs. 1 and 2, I am able to dispose in a convenient manner the pulleys 27, and in so doing to employ a fire-proof structure.

As shown in the drawings, the periphery of the sashes is preferably channeled. As shown in Figs. 2, 3, and 4 the rail of the sash is formed of a channel-bar 7 and angle-bars 28 and 29. As shown in Figs. 8, 9, and 10 this rail is formed of a T-bar $7^a$ and two angle-bars $28^a$ and $29^a$. In Fig. 11 a Z-bar $7^b$ and two angle-bars $28^b$ and $29^b$ are employed for the same purpose. In Fig. 12 a Z-bar $7^c$ and a T-bar $28^c$ constitute the rails. The last is my preferred construction. In each case the pane of the sash is held between the oppositely-arranged faces of the bars which form the rails. A film of asbestos is preferably introduced between the bearing-faces and the pane.

Figs. 9 and 10 illustrate a modification in the bearing between the side rails of the sash and the guide-strips 2. Within the channel in the edge of the sash a suitable bearing-chamber is formed, and within this chamber bearing-balls $13^b$ are confined. These balls are held in operative bearing upon opposite sides of strips 2 by suitably-disposed spring-backings 30. In the form shown in these views, Figs. 9 and 10, the sash is secured from edgewise movement and the connection made tight by spring-plates $15^b$, carried by the sash and engaging the guide-strips. A further modification in this bearing between the side rails of the sash and the guide-strips 2 is shown in Fig. 11. The guide-strip engages upon one side the inner face of one of the walls of the channel and upon the other side a bearing-strip 31, yieldingly mounted upon the sash. A strap-spring 32 and a distance-bolt 33 may be employed for adjusting the position of the strip 31. As already described, strap-spring 32 extends to engage the end of guide-strip 2 to resist edgewise movement of the sash.

Fig. 12 serves further to illustrate a spring-seal for the end of the sash. The strap-spring 34 is arranged to extend throughout the length of the bottom or top rail. It protrudes when the sash is opened beyond the edge of the rail, (and is so shown in the figure.) When the window is closed, however, the spring is compressed into alinement with the edge of the sash and forms a tight contact with the sill.

In Figs. 13, 14, and 15 means for securing and bracing the window-panes are shown. The sash shown is adapted to receive a number of separate panes. On the outer side of the sash extend vertical and horizontal braces 36 and 37. Ordinarily there will be a plurality both of vertical and horizontal braces, and they will form two series. The braces of one series (e. g., the vertical series) are continuous and straight from top rail to bottom rail, and the braces of the other series are interrupted at the meeting-points. The ends of each brace are secured to the sash itself. A similar arrangement of braces is placed on the inner side, and they too are ordinarily disposed in a series of vertical braces 42 and a series of horizontal braces 43. The outer vertical braces being continuous and straight, the inner horizontal braces are made continuous and straight, and vice versa, and the inner braces of the other series instead of being interrupted at the meeting-points are offset at those points. Thus all the inner braces are integral from one side of the sash to the other, and each is secured to the sash at either end. The outer braces 36 and 37 preferably consist of a body portion, adapted to engage the surface of the pane, and a tongue portion 38 and 39, adapted to lie between the edges of the panes. These tongue portions may conveniently be prolonged, as at 40 and 41, for securing in the sashes.

No claim is made herein to the construction of window-sash, as the same forms the subject-matter of another application to be filed in due time.

I claim as my invention—

1. In a house or building structure, wherein the wall of the building at the window-opening at each or either side extends up flush to the window-opening, window-sash guides secured to the side walls of the window-opening, projecting therefrom, and structurally a part thereof, substantially as described.

2. In a house or building structure, wherein the wall of the building at the window-opening at each or either side extends up flush to the window-opening, a window-sash-guide fixture secured to such wall, projecting therefrom, and structurally a part thereof, and a window-sash extending at each or either side to the edge of such window-opening and engaging said guide-fixture, substantially as described.

3. In a house or building structure, wherein the wall of the building at the window-opening at each or either side extends up flush to the window-opening, a window-sash-guide fixture secured to such wall, projecting therefrom, and structurally a part thereof, and a window-sash formed of channel-irons and corner-pieces, the said window-sash extending at each or either side to the edge of the said window-opening and engaging the said guide-fixture, substantially as described.

4. In a window structure, the combination of a window-opening provided with guides or structural parts of the side walls of the said opening, a window-sash having the side portions channeled and a yielding abutment contained within said channel and bearing upon said guides, substantially as set forth.

5. In combination with a wall of a building provided with a window-opening, guiding-strips projecting from opposite edges of the window-opening and a movable sash having the side portions channeled for the reception of the guiding-strips and spring-plates arranged in the channels of the sash and engaging said guiding-strips, substantially as described.

6. In a window structure the combination of a window-opening provided with a guide-strip, a window-sash provided with a peripheral channel, and a spring-plate arranged within said channel and engaging said guide-strip, substantially as described.

7. The combination of a window-opening provided with a rigid bearing-surface, a window-sash provided with a yielding bearing-surface, and ball-bearings engaging said surfaces, substantially as described.

8. In combination with a window-opening provided with opposite bearing-surfaces and a window-sash, oppositely-arranged ball-bearings carried by said sash and engaging said bearing-surfaces, an adjustable spring-block placed between said oppositely-arranged ball-bearings, and two rods each bearing at one end upon one of said ball-bearings and at the other end upon said spring-block, substantially as described.

In testimony whereof I have hereunto set my hand.

OTHO MENDLESOHN OTTE.

Witnesses:
 BAYARD H. CHRISTY,
 F. E. GAITHER.